United States Patent
Radosavljevic (10) Patent No.: US 7,323,638 B1
(45) Date of Patent: Jan. 29, 2008

(54) WALL BOX RECEPTACLE WITH MODULAR PLUG-IN DEVICE

(75) Inventor: Dejan Radosavljevic, La Fayette, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 11/531,588

(22) Filed: Sep. 13, 2006

(51) Int. Cl.
  *H01H 9/02* (2006.01)
(52) U.S. Cl. .................. 174/58; 174/53; 200/43.18; 439/539
(58) Field of Classification Search .......... 174/53, 174/58; 220/3.2–3.9; 200/43.18, 293; 439/535, 439/539, 538, 652, 752, 105, 107, 617, 723, 439/346, 214, 672
  See application file for complete search history.

(56) References Cited

U.S. PATENT DOCUMENTS

| | | | |
|---|---|---|---|
| 6,204,449 B1 * | 3/2001 | Putorti et al. ............. | 174/53 |
| 6,376,770 B1 * | 4/2002 | Hyde ........................ | 174/58 |
| 6,777,611 B2 * | 8/2004 | Ewald et al. ............. | 174/50 |
| 6,857,903 B2 * | 2/2005 | Hyde ........................ | 439/598 |
| 7,052,314 B1 * | 5/2006 | Rose ......................... | 439/539 |
| 7,060,897 B2 * | 6/2006 | Gorman .................... | 174/53 |
| 7,192,289 B2 * | 3/2007 | Kowalski ................. | 439/106 |

* cited by examiner

*Primary Examiner*—Dhiru R. Patel
(74) *Attorney, Agent, or Firm*—Daniel Malley; Bond, Schoeneck & King, PLLC (57) ABSTRACT

A modular wiring system including a wall box receptacle device. The system includes a wiring interface disposed on a first side and electrically coupled to a plurality of receptacle openings disposed on a second side. An adjustable support assembly includes a retaining frame configured to secure the wall box receptacle device therein. A first hinged mounting member is rotatably coupled to a first end of the retaining frame, and a second hinged mounting member is rotatably coupled to a second end of the retaining frame. A modular electrical wiring device includes at least one electrical circuit disposed between a cover member and a rear body member. The at least one electrical circuit is coupled to a plurality of male terminal elements accessibly disposed in the rear body member. The plurality of terminal blades are insertable in the plurality of receptacle openings to establish electrical continuity between the plurality of male terminal elements and the wiring interface.

28 Claims, 9 Drawing Sheets

WALL BOX RECEPTACLE WITH MODULAR PLUG-IN DEVICE

BACKGROUND OF THE INVENTION

1. Field of the Invention

The present invention relates generally to electrical circuit installation, and particularly to electrical devices that facilitate installation of electrical circuits in a building or some other structure.

2. Technical Background

Installing electrical circuits in buildings and/or other structures is typically labor intensive, time-consuming, and a process that requires electricians of various skill levels. As a result the installation process is expensive. The first phase of the installation is commonly referred to as the "rough-in" phase. In new construction, either conduit or armored cable is disposed through out the structure in accordance with the building plans. Junction boxes are installed at appropriate locations, and brackets and metal device boxes are installed throughout the structure where electrical service is desired. Junction boxes, of course, are employed to house the connection point, or junction, of several conductors. Metal device boxes are used to accommodate electrical wiring devices. For example, the types of electrical wiring devices may include, but are not limited to, receptacles, switches, dimmers, ground fault circuit interrupters (GFCIs), arc fault circuit interrupters (AFCIs), transient voltage surge suppressors (TVSS), protective devices, timer devices, sensors of various types, thermostats, lighting fixtures, and/or combinations thereof. After the boxes are placed, the electrical wires are pulled through the conduits (if provided) and all of the circuits are bonded. At this point, the leads from the electrical wires extend from the boxes and are visible and accessible for the next phase of the installation process.

Before discussing the next phase of the process, it is noted that electrical cables may include two to five conductive wires. For example, in a structure that requires high power, the most common way of distributing that power is by employing the three-phase power system. As those of ordinary skill in the art recognize, five wires are employed. Three phase power includes three "hot" or "live" wires. Each of these wires transmits electrical power that is 120 degrees out of phase with the other two hot wires. The other two wires are the neutral conductor and the ground wire. Three phase power typically comes from the power utility via four wires: the three-phase wires, and the neutral. If the current flowing through each of the phases is equal, no current will flow through the neutral. The neutral wire is typically connected to the building ground at the structure's main distribution panel. The five wire cable is distributed from the central panel. Some of the circuits in the structure are designed to provide power to grounded equipment. These circuits may employ three wires, a line conductor (hot wire), a neutral conductor, and a ground. Some circuits may only employ two wires, the line conductor and the neutral conductor.

Referring back to the installation process, after the "rough-in" phase has been completed, the electrical wiring devices are terminated, i.e., they are electrically connected to the wire leads. This part of the installation process is the most costly and time consuming. A journeyman electrician must perform, or supervise, the connection of each wiring device in the structure. In this process, each electrical wire must be stripped and terminated to the device. What is needed is an efficient, labor-saving, and cost effective means for terminating the electrical wires and coupling them to the individual devices.

Another issue relates to the replacement of wiring devices after installation. A home owner may desire to replace an installed wiring device for a variety of reasons. The device may be old or defective, or the homeowner may simply desire a different wiring device functionality (for example, a GFCI rather than a receptacle outlet) at that location within the dwelling. On the other hand, some homeowners do not want to incur the cost of hiring an electrician to replace existing wiring devices. At the same time, these homeowners may not be adequately trained and do not know how to safely replace a wiring device. A homeowner may inadvisably remove the faceplate cover from an energized wiring device and inadvertently become exposed to a shock hazard from the "hot" electrical wiring. What is needed is a modular system that allows previously installed wiring devices to be easily and safely replaced without the risk of being exposed to electrocution or electrical shock.

SUMMARY OF THE INVENTION

The present invention addresses the needs described above by providing a modular system that allows previously installed wiring devices to be easily and safely replaced without the risk of being exposed to electrocution or electrical shock.

One aspect of the present invention is directed to a modular wiring system including a wall box receptacle device. The system includes a wiring interface disposed on a first side and electrically coupled to a plurality of receptacle openings disposed on a second side. An adjustable support assembly includes a retaining frame configured to secure the wall box receptacle device therein. A first hinged mounting member is rotatably coupled to a first end of the retaining frame, and a second hinged mounting member is rotatably coupled to a second end of the retaining frame. A modular electrical wiring device includes at least one electrical circuit disposed between a cover member and a rear body member. The at least one electrical circuit is coupled to a plurality of male terminal elements accessibly disposed in the rear body member. The plurality of terminal blades are insertable in the plurality of receptacle openings to establish electrical continuity between the plurality of male terminal elements and the wiring interface.

In another aspect, the present invention is directed to method. The method includes providing a wall box receptacle assembly including a wall box receptacle device secured to a retaining frame. The wall box receptacle device includes a wiring interface disposed on a first side and electrically coupled to a plurality of receptacle openings disposed on a second side. A first hinged mounting member is coupled to a first end of the retaining frame and a second hinged mounting member coupled to a second end of the retaining frame. The first hinged mounting member and the second hinged mounting member are rotatable between an extended mounting position and a retracted storage position. Electrical wiring is coupled to the wiring interface. The first hinged member and the second hinged member are either rotated into the retracted storage position for storage within a wall box or the first hinged member and the second hinged member are rotated into the extended mounting position for subsequent connection to the wall box. The first hinged mounting member is connected to a first mounting element on the wall box and the second hinged mounting member is connected to a second mounting element on the wall box. A modular electrical wiring device including at least one electrical circuit disposed between a cover member and a rear body member is provided. The at least one electrical circuit is coupled to a plurality of male terminal elements accessibly disposed in the rear body member. The modular electrical wiring device is coupled to the wall box receptacle device. The plurality of male terminal elements are inserted into the plurality of receptacle openings to establish electrical continuity between the plurality of male terminal elements and the electrical wiring.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the modular wiring system of the present invention is shown in FIG. 1, and is designated generally throughout by reference numeral 10.

Figure 1:
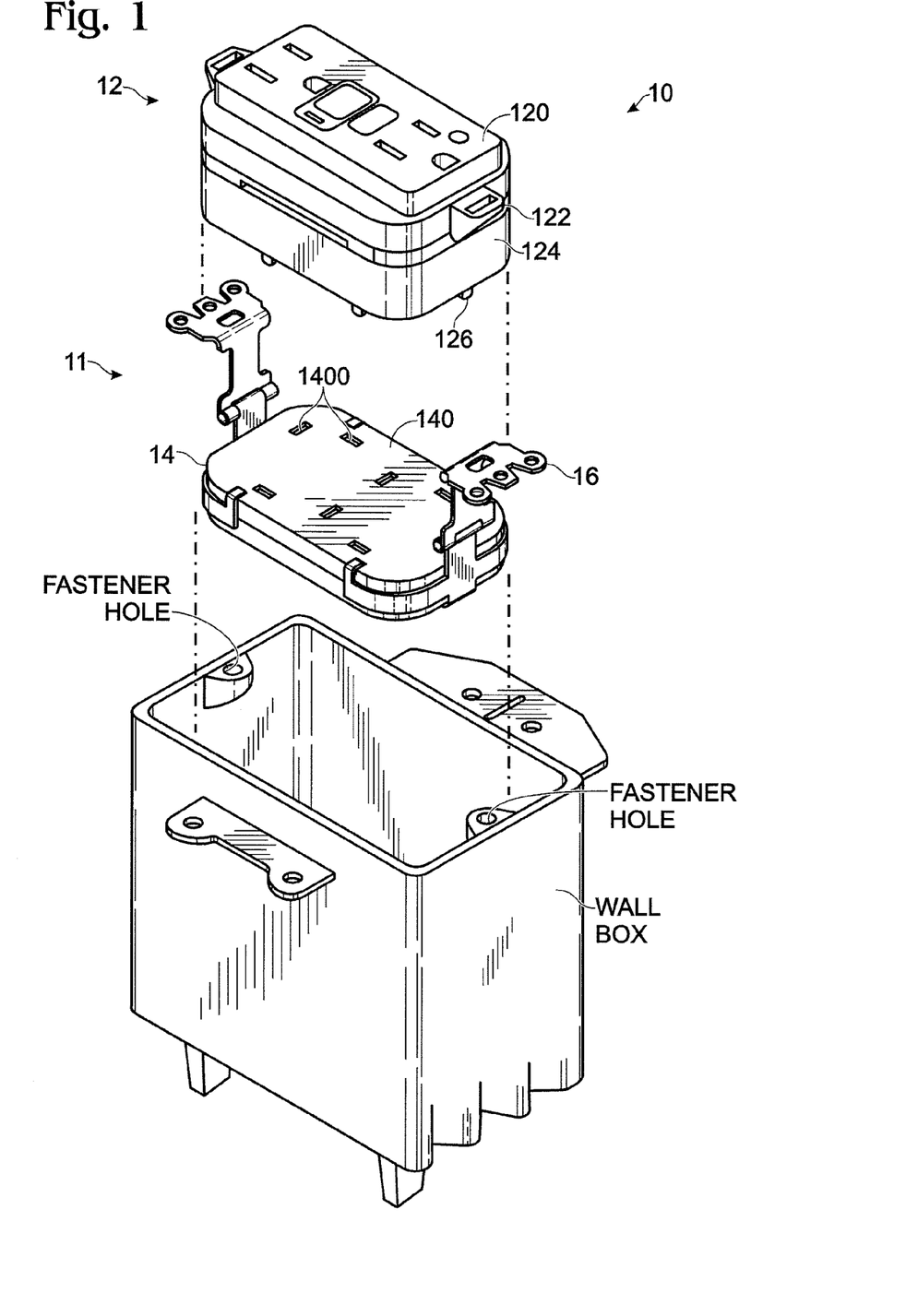
FIG. 1 is an exploded view of the modular system in accordance with one embodiment of the present invention.

As embodied herein, and depicted in FIG. 1, an exploded view of the modular system 10 in accordance with one embodiment of the present invention is disclosed. Modular system 10 includes a modular wiring device 12 which is configured to mate with the wall receptacle assembly 11, which is a combination of the wall box receptacle device 14 and adjustable support assembly 16. After the wall receptacle assembly 11 is disposed in the wall box and construction is substantially completed, i.e., the dry-wall is attached to the wall studs, modular wiring device 12 is plugged into a wall box receptacle device 14. In fact, once the electrical wiring from the electrical distribution system is connected to wall box receptacle 14 and assembly 11 is disposed in the wiring box, the electrical distribution system may be energized. This feature of the present invention allows the homeowner to replace one type of wiring device with another without being exposed to a substantial risk of shock or electrocution.

The modular wiring device 12 may include various types of electrical circuitry disposed in a housing that consists of cover member 120 and rear body member 124. A separator 122 may be disposed between cover member 120 and rear body member 124. The circuitry is coupled to the male terminal blades 126 disposed in rear body member 124. The terminal blades 126 are inserted into the receptacle openings 1400 provided in the accessible cover 140 of the wall box receptacle device 14. When blades 126 are inserted into receptacles 1400, electrical continuity is established between the two devices.

Figure 2A:
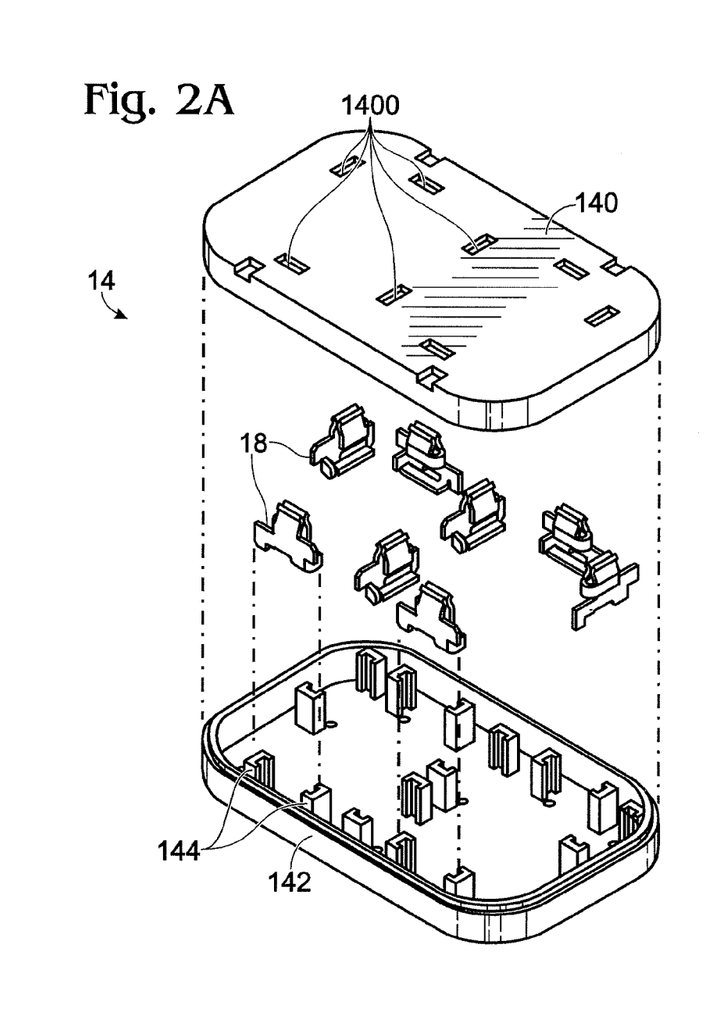
FIGS. 2A-2C are perspective views of the wall receptacle device in accordance with an embodiment of the present invention.
Figures 2B, 2C:
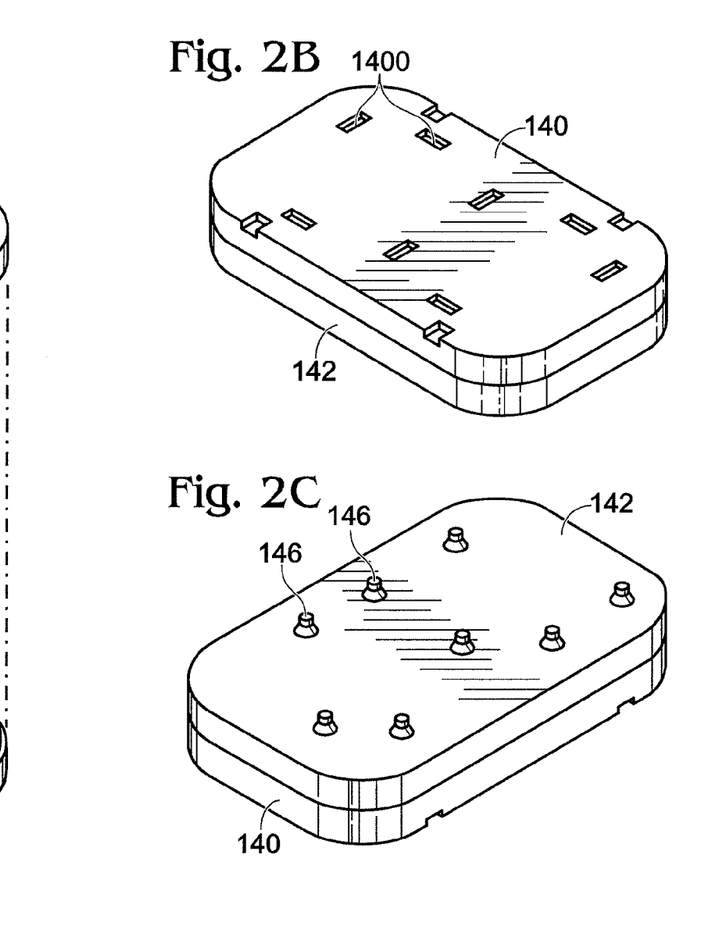

FIGS. 2A-2C provide various perspective views of the wall receptacle device 14 in accordance with the present invention. FIG. 2A is an exploded view of wall box receptacle device 14 and is shown to include wall box receptacle cover 140 and wall box receptacle body member 142. The wall box receptacle body 142 includes a plurality of retaining slots 144 formed in the interior of wall box receptacle body member 142. Slots 144 are configured to hold speed wiring terminals 18 therein. Wiring terminals 18 are aligned with receptacle openings 1400 in cover 140.

FIG. 2B shows the assembled wall box receptacle device 14 with front cover 140 being visible. The pattern of receptacle openings 1400 in receptacle 14 accommodates a broad variety of wiring devices such as a standard outlet receptacle device, an electrical switch device including one or more switches disposed on cover 120, a light dimmer device, a TVSS, an arc fault circuit interrupter (AFCI), occupancy sensors, temperature sensors, thermostats, a night light, combination devices such as a GFCI/night light combo, a receptacle/switch combo, etc.

Referring to FIG. 2C, the assembled wall box receptacle device 14 is shown with rear body member 142 being visible. Note that the wiring terminals 18 are aligned with wire interface openings 146 disposed in the surface of body member 142. As shown, the openings are raised somewhat relative to the surface region.

Figures 3, 7:
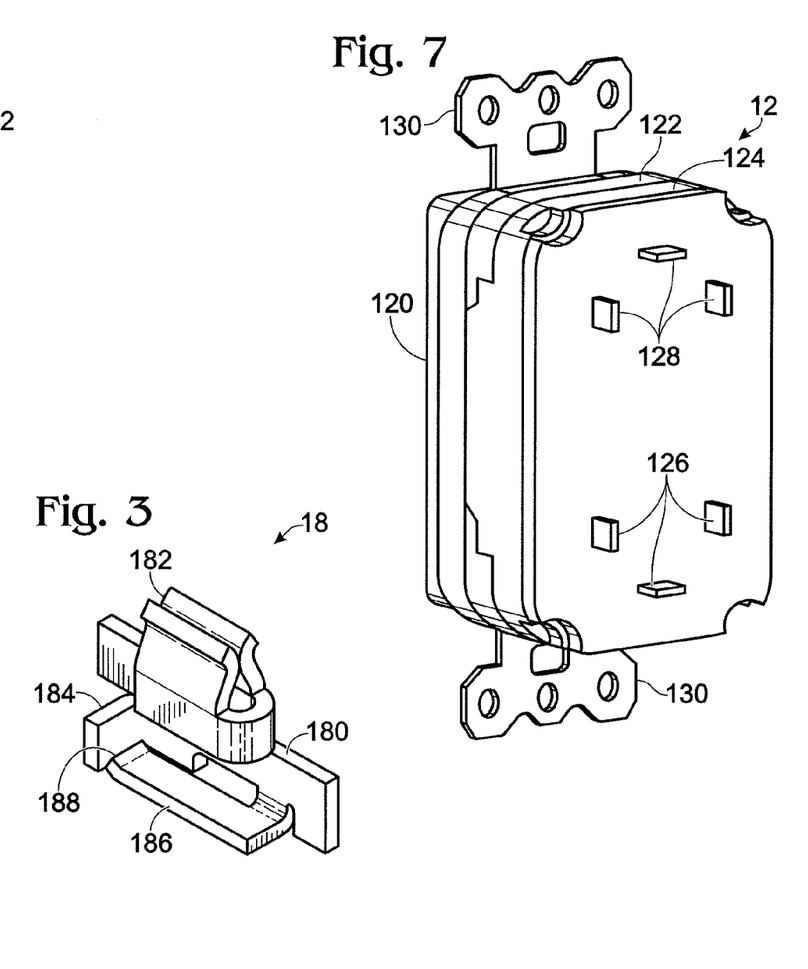
FIG. 3 is a perspective view of the speed-wire element disposed in the wall receptacle device.
FIG. 7 is a bottom perspective view of the GFCI wiring device depicted in FIG. 1.

Referring to FIG. 3, a perspective view of the speed-wire element 18 is disclosed. Speed-wire element 18 includes a base member 180 that is configured to be inserted into slot 144 (FIG. 2A). The placement of base member 180 into slot 144 aligns the female receptacle contacts 182 with receptacle openings 1400 disposed in the front cover member 140. The placement of base member 180 into slot 144 also aligns the speed wire opening 188 with the wire interface openings 146 disposed in the surface of rear body member 142. The speed-wire terminal portion of element 18 includes stationary terminal portion 184 and movable terminal portion 186 having speed wire opening 188 disposed therebetween.

When an electrically conductive wire is inserted into wire interface opening 146, movable terminal portion 186 moves to accommodate the wire as it moves inwardly. However, if the person installing the wire attempts to apply a tensile force to the wire, i.e., tries to pull the wire out of the interface opening 146, movable terminal member will rotate toward stationary member 184 and pinch the wire therebetween, preventing wire removal.

Figure 4A:
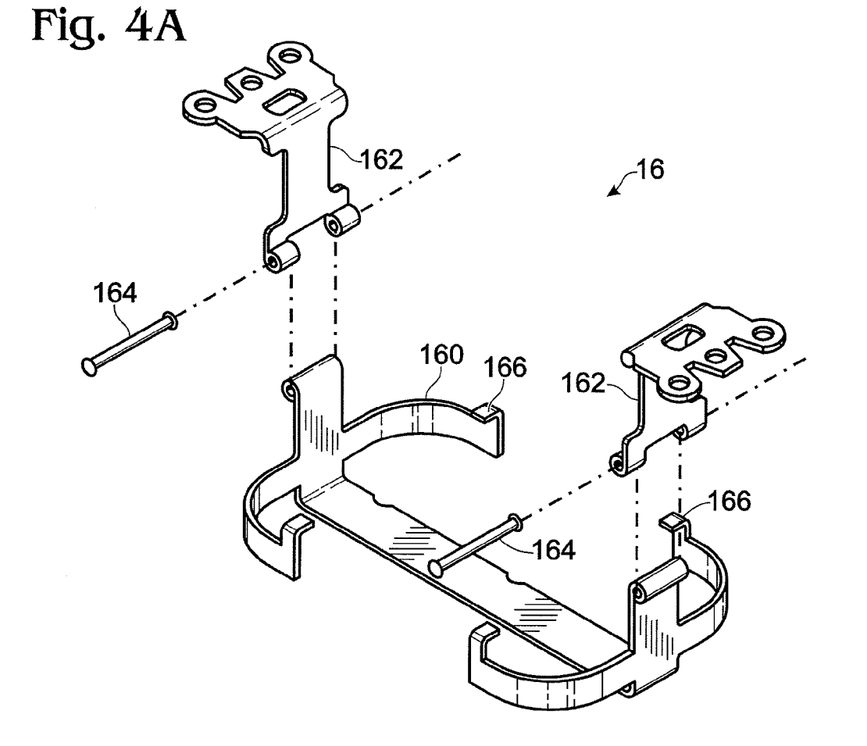
FIGS. 4A-4B are perspective views of the adjustable support assembly in accordance with the present invention.
Figure 4B:
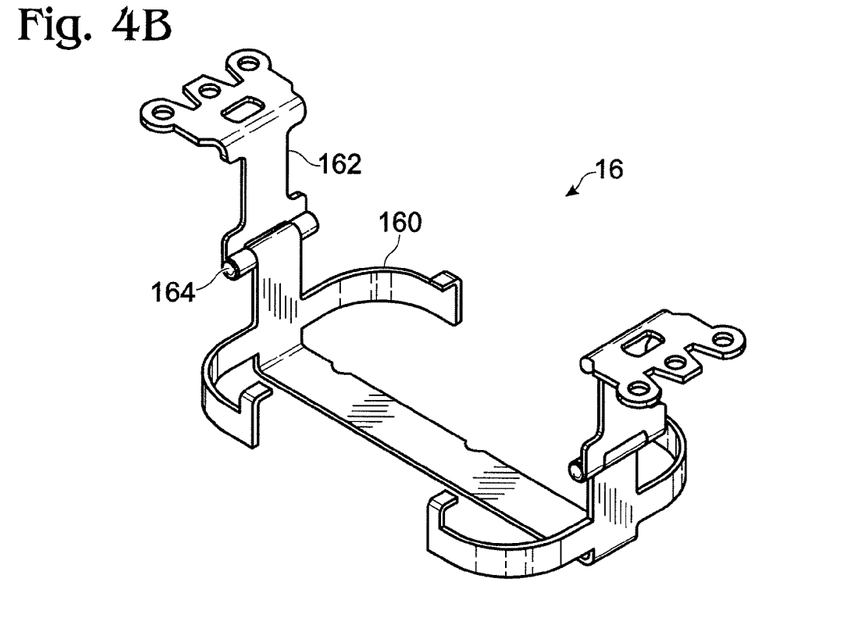

FIGS. 4A-4B are perspective views of the adjustable support assembly 16 in accordance with the present invention. FIG. 4A is an exploded view of the support assembly 16. The adjustable support assembly 16 includes a retaining frame 160 that is configured to secure the wall box receptacle device therein. The retaining frame 160 is characterized by a form factor that matches wall box receptacle device 16. Once receptacle device 16 is inserted into retaining frame 160, retaining clips 166 prevent the wall box receptacle device from moving or slipping out of frame 160. Support assembly 16 also includes two rotatable mounting members 162 that are coupled at both ends of retaining frame 160 by hinges 164. FIG. 4B shows the support assembly fully assembled.

Figure 5A:
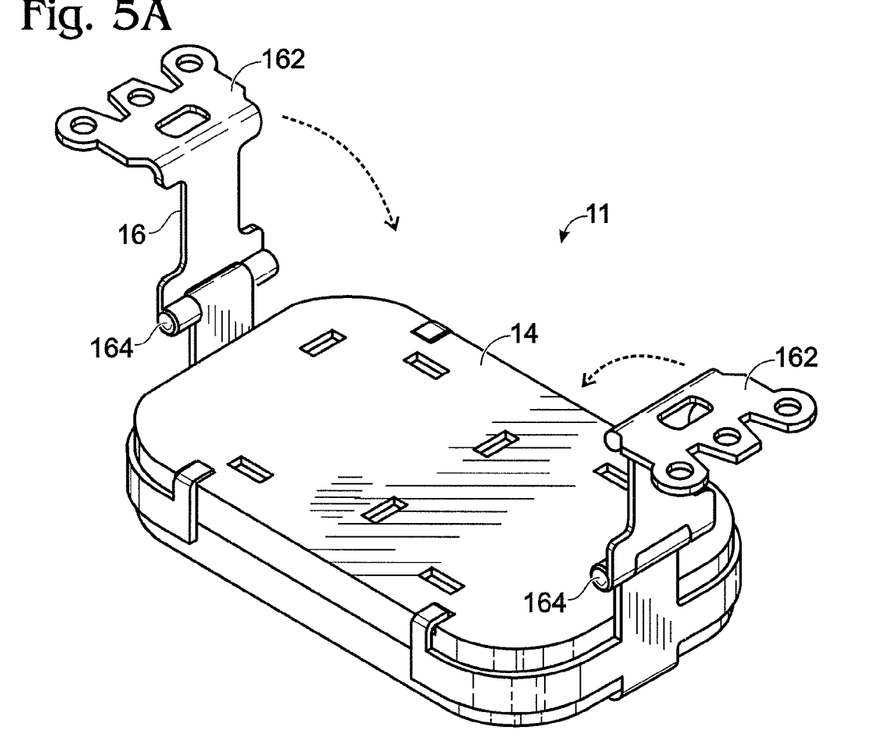
FIGS. 5A-5B are perspective views of the wall receptacle assembly depicted in FIG. 1.
Figure 5B:
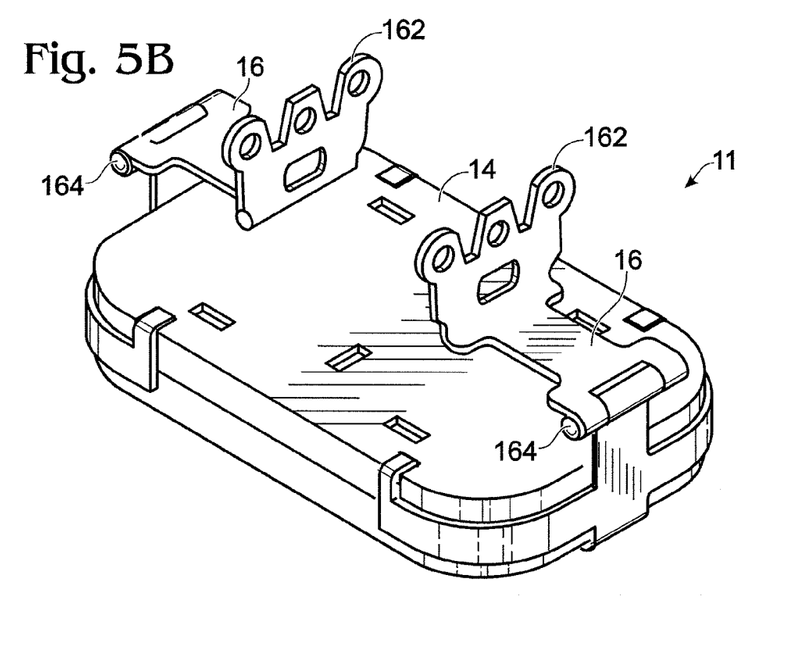

Referring to FIG. 5A and FIG. 5B, perspective views of the wall receptacle assembly 11 is shown. As noted previously, assembly 11 is a combination of wall box receptacle device 14 and adjustable support assembly 16. FIG. 5A shows the wall receptacle assembly 11 in the extended mounting position. FIG. 5B shows the wall receptacle assembly 11 in the retracted storage position. Assembly 11 is placed in the extended mounting position by rotating the hinged mounting members 162 outwardly such that they are disposed in alignment with the fastener holes in the wall box (See FIG. 1). Assembly 11 is placed in the retracted storage position (FIG. 5B) by rotating the hinged mounting members 162 toward each other to provide the clearance that allows assembly 11 to be stowed in the wall box. The benefits associated with having a device that is rotatable between an extended position and a retracted position are apparent when one considers how buildings are typically constructed.

After the stud walls are nailed into place, wall boxes are attached to the studs in accordance with the electrical distribution blueprint. Subsequently, the electrical distribution wiring is routed through the wall studs and pulled through the individual wall boxes. When conventional wiring devices are being installed, the wiring devices are not installed until after the sheet rock is placed. The construction personnel cannot use the building's electrical distribution to obtain power for obvious reasons.

Figure 11:
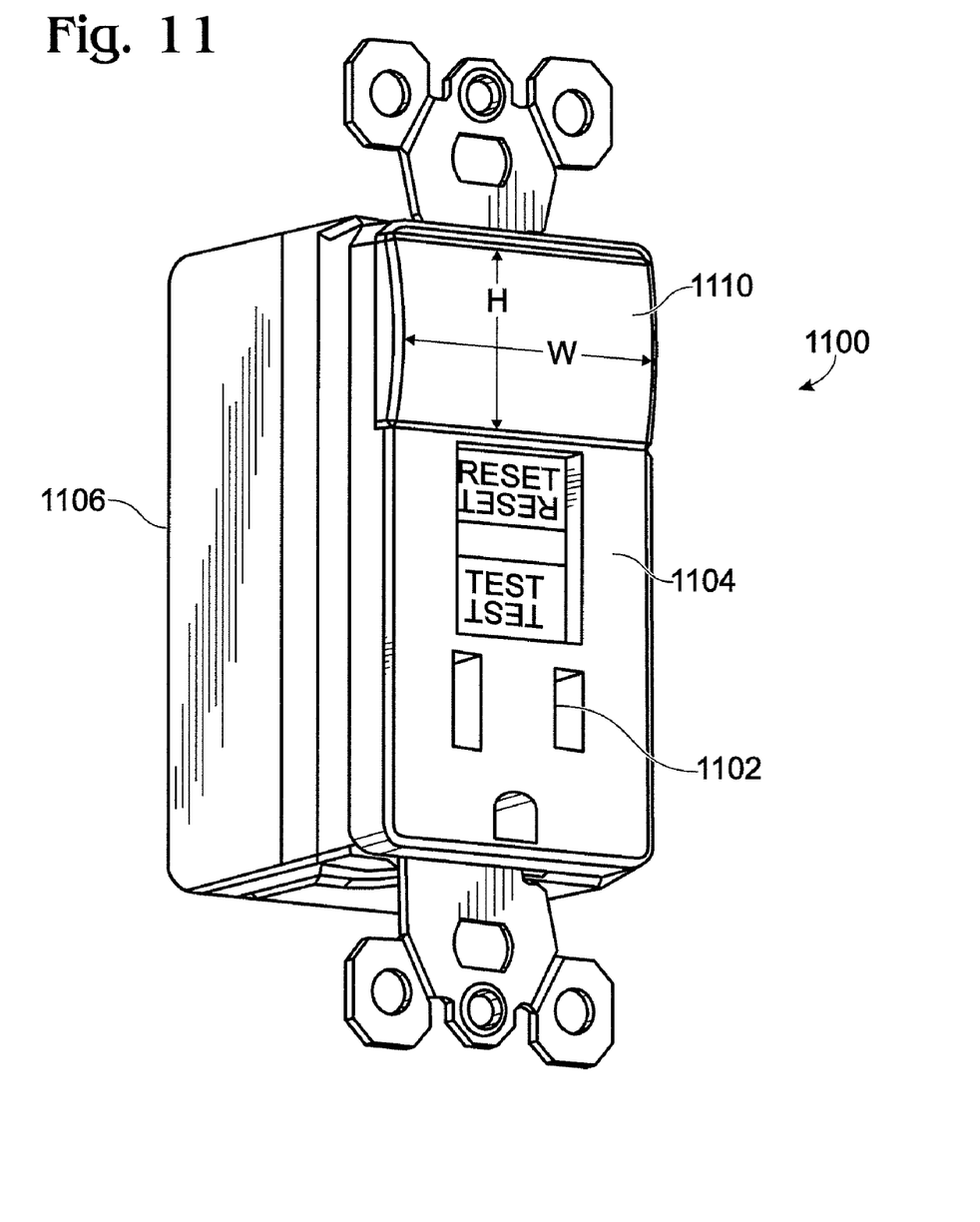
FIG. 11 is a perspective view of a GFCI/Light combination device.

When the present invention is employed, however, a qualified electrician will attach the electrical distribution wires to the wall box receptacle 14 via the wire interface openings 146. After the wires are connected to wall box receptacle device 14, assembly 11 may be placed in the retracted storage position and stowed in the wall box. This procedure is followed until each wall box receptacle device 14 is installed. At this point, the electrical distribution system may be energized. In fact, a worker who does not have to be a qualified electrician may be assigned the task of retrieving a wall box receptacle device 14 from the wall box and plug in a wiring device 12 as a means for providing temporary power to the construction site. Afterwards, the wiring device 12 may be unplugged and the receptacle device 14 re-stowed in the wall box. At some point in the process, the wall studs are covered by sheet rock or some other interior wall material. The dry-wall installer safely cuts a hole in the sheet rock to create an opening for each wall box. After this step is completed, a worker, who does not have to be a qualified electrician, pulls the wall box receptacle assembly 11 from each wall box, places the mounting members 162 in the extended mounting position, and mounts the assembly 11 to wall box. In the next step, the worker merely plugs in the appropriate wiring device 12 into receptacle 14 to complete the installation. If the inspector reviews the installation and discovers that the worker has installed the "wrong" wiring device, the worker merely unplugs the previously installed wiring device 12 and replaces it with a different one.

Note that the wall box receptacle assembly 11 is self-adjusting. In the extended position, the mounting members are configured to press against the interior wall surface such that wiring device 12, when inserted into receptacle device 14, is disposed in the optimal position relative the interior wall surface. As such, the installation of the wall plate trim is always a perfect fit.

Figure 6:
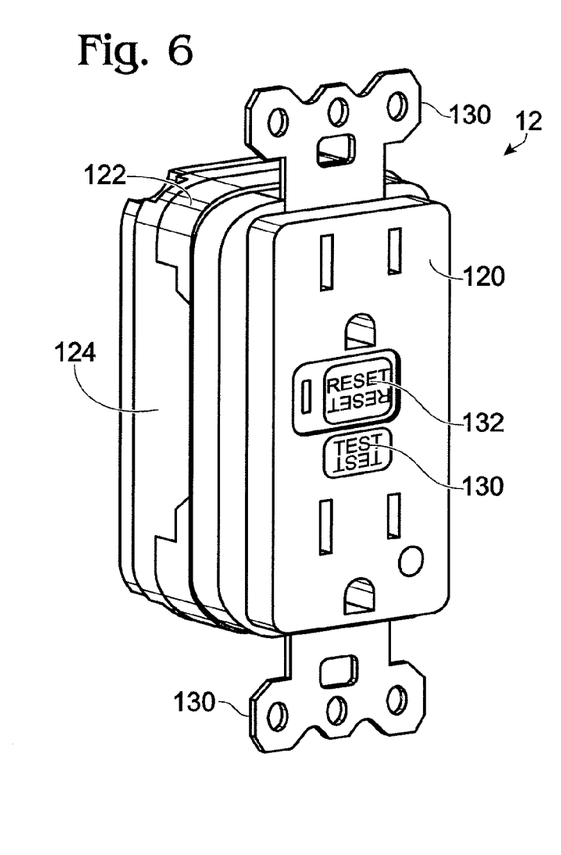
FIG. 6 is a top perspective view of the GFCI wiring device depicted in FIG. 1.

As embodied herein and depicted in FIG. 6, a top perspective view of the GFCI wiring device depicted in FIG. 1 is shown. In this embodiment, wiring device 12 is a GFCI having a test button 130 and a reset button 132 disposed on the cover member 120. However, those of ordinary skill in the art will understand that wiring device 12 may implement any type of wiring device such as a standard outlet receptacle device, an electrical switch device including one or more switches disposed on cover 120, a light dimmer device, a TVSS, an arc fault circuit interrupter (AFCI), occupancy sensors, temperature sensors, thermostats, a night light, combination devices such as a GFCI/night light combo, a receptacle/switch combo, etc.

Referring to FIG. 7, a perspective view of the rear body portion of the GFCI wiring device is shown. Rear body member 142 includes male load terminal elements 126 and male line terminal elements 128 protruding from the rear surface. As noted above, the male terminal elements mate with the corresponding receptacle openings disposed in receptacle device 14. Those of ordinary skill in the art will understand that the number of male terminal element elements (126, 128) depends on the type of wiring device. Accordingly, the line and load terminal elements may include two or more male terminal elements.

Figure 8:
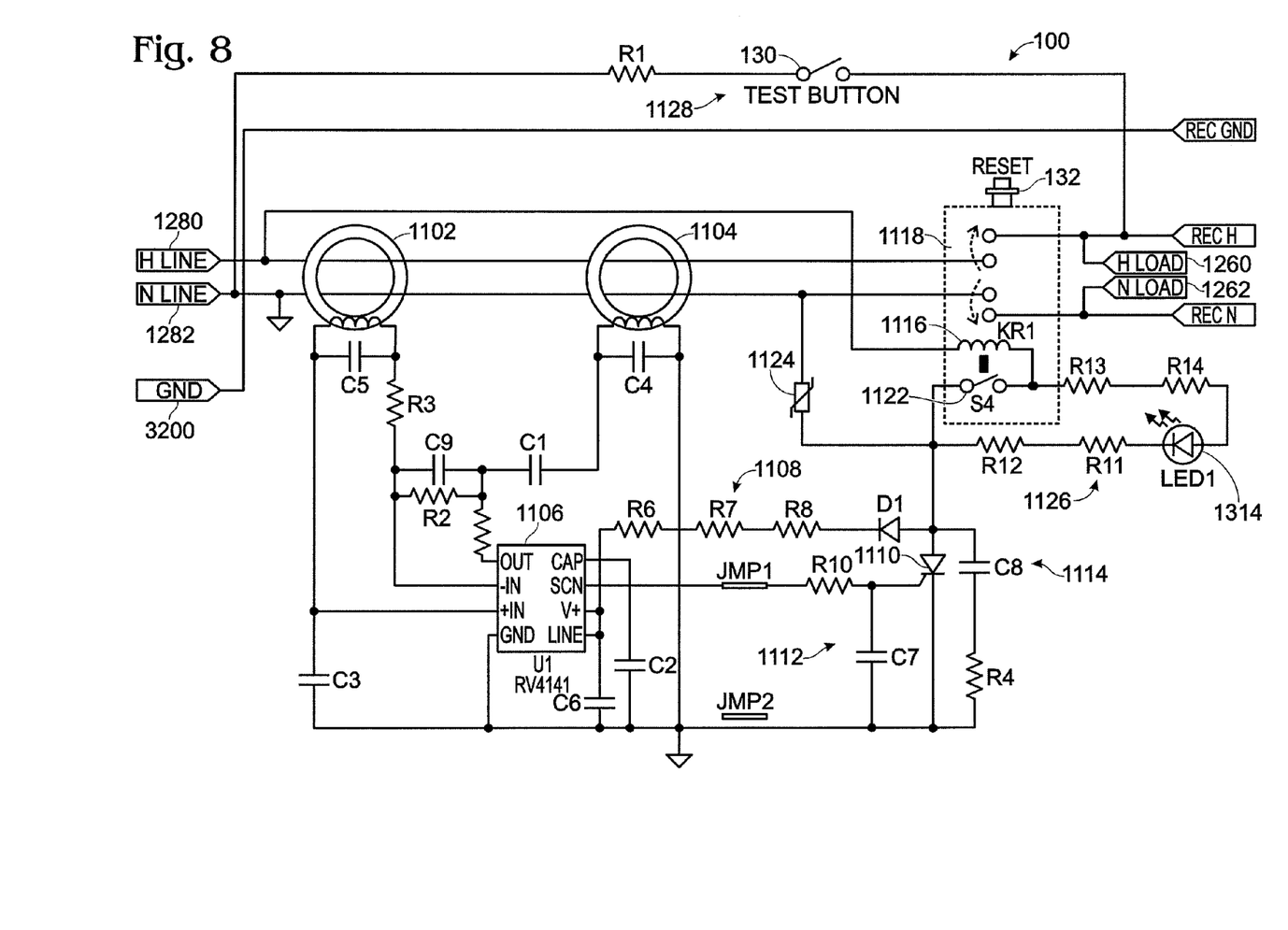
FIG. 8 is a schematic diagram of the GFCI device depicted in FIG. 1.

As embodied herein and depicted in FIG. 8, a schematic view of the protective circuit employed in the electrical wiring device of the present invention is disclosed. Moving from left to right in the schematic, it is seen that GFCI 100 includes hot line male terminal element 1280, neutral line receptacle blade 1282, and ground receptacle blade 3200. On the load side of device 12, there is hot load male terminal element 1260, neutral load male terminal element 1262 and a pair of user accessible receptacles, each including a hot receptacle terminal and a neutral receptacle terminal.

The ground fault circuitry includes a differential transformer 1102 which is configured to sense load-side ground faults. Transformer 1104 is configured as a grounded neutral transmitter and is employed to sense grounded-neutral fault conditions. Both transformers are disposed in toroid assembly L1. Both (LINE) conductors pass thru the sensors. Differential transformer 1104 senses currents from HOT to GROUND but not HOT to NEUTRAL. Both differential transformer 1102 and grounded-neutral transformer 1104 are coupled to detector integrated circuit 1106. Detector 1106 is powered by a power supply circuit 1108 connected to pin $V^+$ on detector 1106. The detector output, provided on output pin silicon controlled rectifier (SCR), is connected to the control input of SCR 1110. Filter 1112, comprising resistor R10 and capacitor C7, low-pass filter the detector output signal. GFCI 100 also includes a snubber circuit 1114 that includes resistor R4 and capacitor C8. Snubber circuit 1114 prevents voltage transients from triggering SCR 1110.

When SCR 1110 is turned ON, solenoid 1116 is energized, actuating circuit interrupter 1118. Solenoid 1116 remains energized for a time period that is typically less than about 25 milliseconds. Circuit interrupter 1118 trips, resulting in the line terminals being disconnected from respective load terminals. After the fault condition has been eliminated, the circuit interrupter 1118 may be reset by way of reset button 132. In one embodiment, the reset mechanism actuated by reset button 132 is purely mechanical in nature and does not include any electrical contacts for test initiation.

GFCI 100 addresses certain end of life conditions by denying power to the load when the device is unable to function. As an example of an end-of-life condition, solenoid 1116 is susceptible to burn-out if SCR 1100 becomes shorted out, or is permanently turned ON. Solenoid 1116 may burn out if it is energized for more than about 1 second. Once the solenoid 1116 burns out, the circuit interrupter 1118 is incapable of being tripped. Solenoid burn-out prevention is provided by auxiliary switch 1122. Auxiliary switch 1122 is configured to open when the circuit interrupter 1118 is in the tripped position. If SCR 1110 is shorted out, or permanently ON, auxiliary switch 1122 ensures that solenoid 1116 is not permanently connected to a current source. The user may attempt to reset GFCI 100 by depressing the reset button 1120, but the circuit interrupter 1118 will immediately trip in response to the current flowing through the solenoid 1116. Because the trip mechanism 1118 is coupled to the auxiliary switch 1122, auxiliary switch 1122 is opened before solenoid 1116 burns out.

Another failure mode that is addressed by GFCI 100 relates to the end-of-life failure mode of movistor (MOV) 1124. MOV 1124 is disposed in series with auxiliary switch 1122 and trip solenoid 1116. This arrangement significantly reduces the probability of damage due to an over-current situation. When MOV 1124 reaches end-of-life and shorts out, trip solenoid 1116 is energized and auxiliary switch 1122 is opened. As previously described, when auxiliary switch 1122 opens, the flow of short circuit current is terminated before any damage to GFCI 100 ensues.

GFCI 100 also includes trip indication circuit 1126. Trip indicator 1126 is implemented by placing LED1 and series resistors (R11-R14) in parallel with auxiliary switch 1122. LED1 is configured to emit a visual signal when circuit interrupter 1118 and auxiliary switch 1122 are in an open state (tripped).

GFCI 100 also includes a test circuit 1128. The test circuit 1128 is coupled between the line neutral terminal 1282 and the hot receptacle terminal. The test circuit includes a test button 130 disposed in series with test resistor R1.

Figure 9:
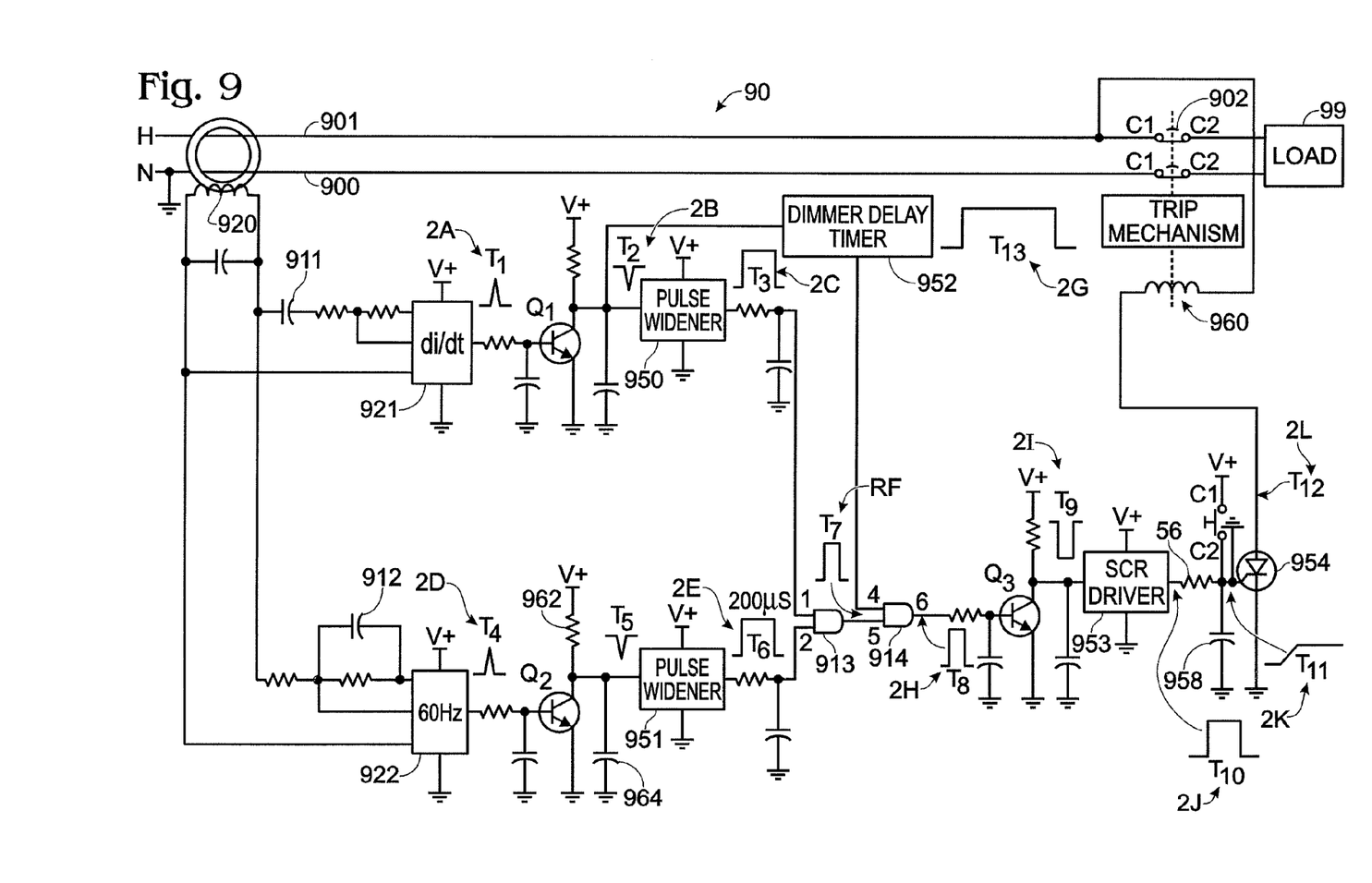
FIG. 9 is a schematic diagram of an arc fault circuit interrupter AFCI device in accordance with the present invention.

Referring to FIG. 9, an arc fault circuit interrupter (AFCI) 90 is illustrated in schematic form in accordance with the present invention. AFCI 90 is formed from components that are readily available and that can be easily integrated into an electrical receptacle, plug, or in-line device. The circuit is designed so that it can be manufactured in the same form as ground fault circuit interrupter (GFCI) receptacle devices. AFCI 90 protects an electrical circuit which includes at least a neutral conductor 900 and a line conductor 901 connected to a power source (not shown). A ground conductor (not shown) is optionally present. AFCI 90 detects electrical arcs occurring between line conductor 901 and ground, neutral conductor 900 and ground should the power source be of reverse polarity, or line conductor 901 and neutral conductor 900.

A circuit interrupter 902 is connected in series with line conductor 901 between the power source and a load 99. This embodiment incorporates a first stage arc sensor 920, shown as a current transformer, which is configured to respond to the rate of change of neutral and/or line conductor current with respect to time. Sensor 920 may be designed with a physically small core of a type and number of secondary turns which gives optimum sensitivity during arcing. Either a single conductor (LINE) or both conductors can pass thru the sensor. The arc fault detector detects arcs that are either LINE to GROUND or LINE to NEUTRAL. Sensor 920 feeds two detector/amplifiers 921, 922. Detector/amplifiers 921, 922 are preferably RV4141A (Fairchild Semiconductor) low power ground fault interrupter ICs. Detector/amplifier 921, also referred to as the di/dt stage, has a high pass filter capacitor 911 on its input side, while detector/amplifier 922, also referred to as the 60 Hz or "threshold" stage, uses a low pass filter capacitor 912 in a feedback stage. The 60 Hz threshold detector 922 controls the level at which an arcing condition is to be detected, e.g., at a 75 Ampere or greater load current.

Figure 10:
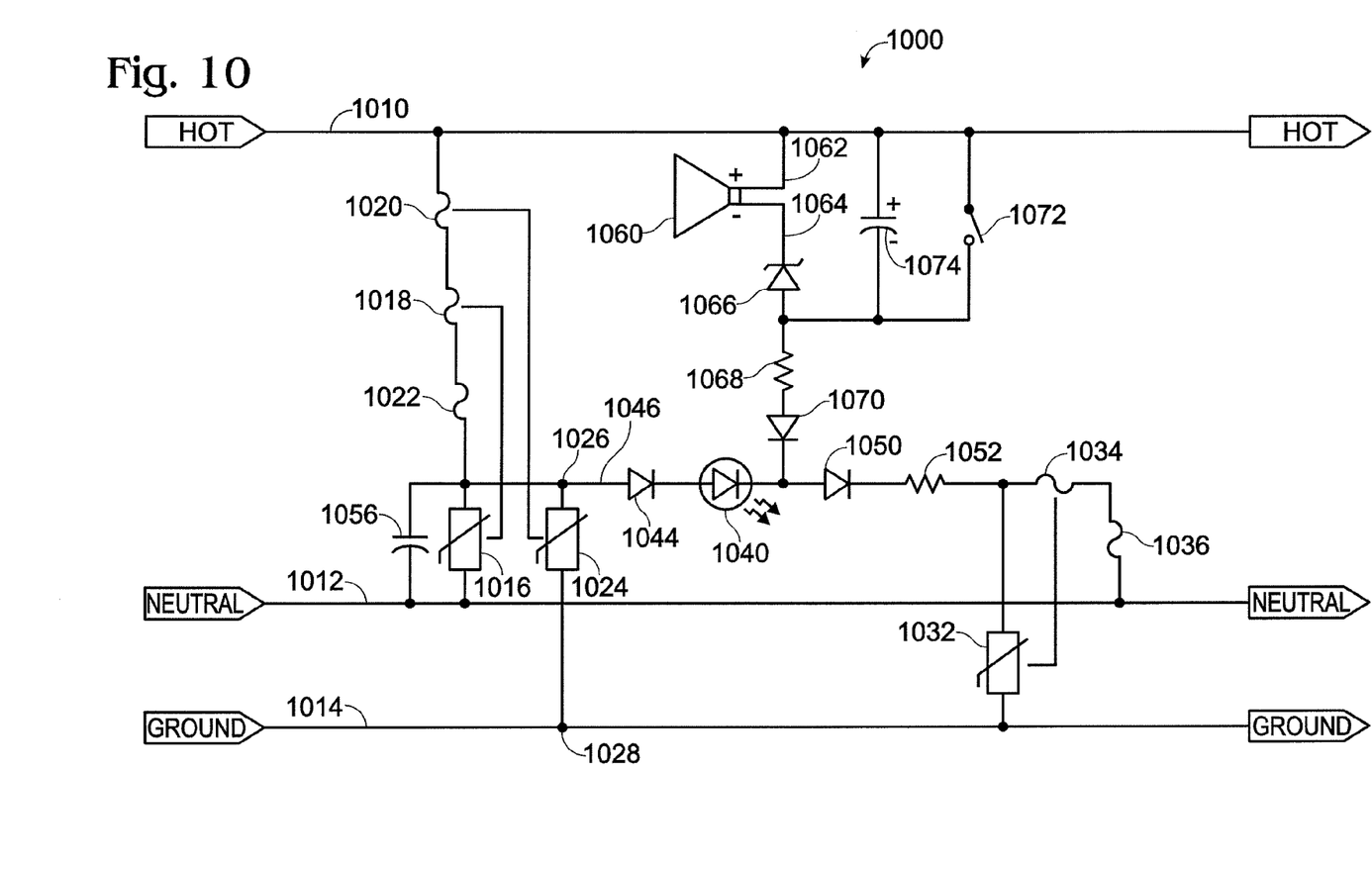
FIG. 10 is a schematic diagram of a transient voltage surge suppressor (TVSS) in accordance with the present invention.

Referring now to FIG. 10, a transient voltage surge suppressor (TVSS) in accordance with the present invention is illustrated in schematic form. A TVSS, also known as a surge protective device (SPD), protects wiring or a load from overvoltages such as occur during lightning storms. TVSS 1000 is configured to protect a low voltage 120 VAC single phase electrical circuit. The circuit includes three conductors that for convenience are referred to herein as the hot 1010, neutral 1012, and ground 1014 conductors. Transient voltages are known to occur between any pair of two of these conductors, and surge suppression devices, such as metal oxide varistors, are arranged to absorb transient voltage surges between any pair of the conductors. Fuses are provided for disconnecting the surge suppression devices from the circuit in the event of failure. Two specific failure modes are provided for, over current failure and temperature failure.

A first metal oxide varistor 1016, such as a 150 volt RMS metal oxide varistor is connected in series with a first thermally responsive fuse 18, a second thermally responsive fuse 1020, and a conventional over current fuse 1022, and the series combination is connected between the hot conductor 1010 and the neutral conductor 1012. A second varistor 1024 of the same type is connected at one end 1026 in series with three fuses just mentioned, and the other end 1028 is connected to the ground conductor. These two varistors protect the hot-neutral and hot-ground pairs. Each of the thermally responsive fuses 1018, 1020 is positioned physically close to one of the varistors 1016, 1024, so that a rise in temperature of the varistor, as would be caused by a failure, causes the adjacent fuse to open. Since the two thermally responsive fuses 1018, 1020 are connected in series, the thermal failure of either of the varistors will cause the connection of both varistors to the hot conductor to be broken. A third metal oxide varistor 1032 is connected in series with another thermal fuse 1034, and an over current fuse 1036. The combination of the third varistor 1032 and the two fuses 1034, 1036 is connected between the neutral conductor 1012 and the ground conductor 1014. A thermal failure or an impedance failure of the third varistor device 1032 will cause one of the thermal fuse 1034 or the over current fuse 1036 to open, thereby disconnecting the varistor from the neutral-ground circuit.

A visible indicator, such as a light emitting diode 1040, is connected between the hot conductor 1010 and the neutral conductor, 1012 so that the light emitting diode 1040 is illuminated when all three of the varistors 1016, 1024, 1032 are functional, more particularly when none of the fuses 1018, 1020, 1022, 1034, 1036 is blown. A half wave rectifier diode 1044 has its cathode 1046 connected to the electrical conductor in series with the two thermal fuses 1018, 1020 and the over current fuse 1022, feeding the first two varistors 1016, 1024. The cathode of the rectifier diode 1044 is connected to one terminal of the light emitting diode 1040. The other terminal of the light emitting diode 1040 is connected through a blocking diode 1050 to a current limiting resistor 52, arranged in series, and then through the third thermal fuse 1034 and third over current fuse 1036 to the neutral electrical conductor 1012. A decoupling capacitor 1056 is preferably connected between the anode of the diode 1044 and the neutral conductor 1012.

When all of the fuses 1018, 1020, 1022, 1034 and 1036 are intact, that is when no fault has occurred, a circuit is created from the hot-conductor 1010 through the rectifier diode 1044, the light emitting diode 1040, the blocking diode 1050, the current limiting resistor 1052 and thence to the neutral conductor. The light emitting diode provides visible indication. If any of the three thermal fuses 1018, 1020, 1034 or two over current fuses opens 1022, 1036, the circuit is interrupted and the light emitting diode is extinguished, alerting a fault condition.

A TVSS 1000 in accordance with this invention also provides an audible indication of a fault in either of the varistors 1016, 1024 protecting the hot-neutral circuit or the hot-ground circuit respectively. A device, such as a simple buzzer 1060 or a piezoelectric device, has one terminal 1062 connected to the hot conductor 1010, and the other terminal 1064 connected by way of the series combination of a zener diode 1066, a current limiting resistor 1068, a first blocking diode 1070, second blocking diode 1050, second current limiting resistor 1052, the thermal fuse 1034, and the over current fuse 1036 to the neutral conductor 1012. The first and second thermal fuses 1018, 1020 and the first over current fuse 1022 are connected in series with rectifier diode 1044 and the light emitting diode 1040 between the hot electrical conductor 1010 and the junction of the two blocking diodes 1070, 1050 just mentioned, so that in normal operation no significant voltage passes through the buzzer, and the buzzer remains silent. If either of the varistors 1016, 1024 bridging the hot-neutral or hot-ground fails and any of the first and second thermal fuses 1018, 1020 and the first over current fuse 1022 is opened, voltage across the buzzer 1060 will cause it to sound.

In order to allow a user to deactivate the buzzer while awaiting repair, a normally open switch 1072 is connected effectively across the combination of the buzzer 1060 and the zener diode 1066. When the switch 1072 is closed, current through the buzzer 1060 is shunted through the switch and the buzzer is silenced. A capacitor 1074 is provided across the zener/audio alarm network to provide a DC voltage component to improve the audio alarm operating performance.

The buzzer deactivating switch 1072 is a simple normally open electrical switch, rather than a device that permanently deactivates the alarm 1060 or permanently interrupts a circuit trace. The switch 1072, once closed, can be opened at will and the buzzer 1060 reactivated. Accidentally deactivating the buzzer might destroy the audible alarm feature of the device permanently, and require its replacement even before it is installed. The use of a normally open switch in accordance with this invention eliminates this problem, and allows the alarm to be deactivated and reactivated.

As embodied herein and depicted in FIG. 11, GFCI/Light combination device 1100 is disclosed. The electrical wiring device 1100 includes a cover member 1104 coupled to a rear body portion 1106. The form factor of rear body member 1106 is substantially identical to the wiring device depicted in FIG. 6 and FIG. 7. Wiring device 1100 includes a GFCI circuit of the type disclosed in FIG. 8, and a light source disposed under lens cover 1110. In an aspect of the embodiment, the light source functions as a pilot light by illuminating the ambient environment surrounding the electrical wiring device. The light source is connected to the line terminal elements in this embodiment. Accordingly, the light source is continuously energized as long as power is being provided to the device.

In another embodiment, the light source functions as a circuit status indicator and is connected to the load terminal elements. The light is, therefore, energized when device 1100 is in the reset state and the light is OFF when the GFCI is tripped. The light source may be implemented using any suitable device, such as an LED. However, the light source may be implemented using a neon source, an incandescent source, etc.

The light source may be implemented using a single-element light source or a multi-element light source as shown. For example, twin LEDs may be disposed under lens cover 1110. Those of ordinary skill in the art will understand that the wavelength of the illumination produced by the light source will depend on the type of source used, and may be selected as a function of the task being performed by the light source; e.g., a night-light, a status indicator, a room illuminator, etc.

Those of ordinary skill in the art will also understand that the lens cover 1110 may be made of a either a clear or a translucent material in accordance with design factors such as the type of light source, the wavelength radiated by the light source, the desired intensity, or softness, of the illumination, the function of the light, and other considerations. The lens cover 1110 may be removable from the housing cover 1104 for access to the light source.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non claimed element as essential to the practice of the invention.

It well be apparent to those skilled in the art that various modifications and variations can be make to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

I claim:

1. A modular wiring system comprising:
a wall box receptacle device including a wiring interface disposed on a first side and electrically coupled to a plurality of receptacle openings disposed on a second side;
an adjustable support assembly including a retaining frame configured to secure the wall box receptacle device therein, a first hinged mounting member rotatably coupled to a first end of the retaining frame, and a second hinged mounting member rotatably coupled to a second end of the retaining frame; and
a modular electrical wiring device including at least one electrical circuit disposed between a cover member and a rear body member, the at least one electrical circuit being coupled to a plurality of male terminal elements accessibly disposed in the rear body member, the plurality of terminal elements being insertable in the plurality of receptacle openings to establish electrical continuity between the plurality of male terminal elements and the wiring interface.

2. The system of claim 1, wherein the wiring interface includes a plurality of wire interface apertures, each of the plurality of wire interface apertures being configured to receive an electrical conductor therein.

3. The system of claim 2, further comprising a plurality of speed wire terminals disposed within the wall box receptacle device, each of the plurality of speed wire terminals being coupled to a corresponding one of the plurality of wire interface apertures.

4. The system of claim 3, wherein each of the plurality of speed wire terminals further comprises a female electrical receptacle terminal in communication with a corresponding one of the plurality of receptacle openings, the female electrical receptacle terminal being configured to mate with one of the male terminal elements.

5. The system of claim 1, wherein the first hinged mounting member and the second hinged mounting member are rotatable between an extended mounting position and a retracted storage position.

6. The system of claim 5, wherein the wall box receptacle device may be stowed within a standard wall box when the first hinged mounting member and the second hinged mounting member are in the retracted storage position.

7. The system of claim 5, wherein the first hinged mounting member and the second hinged mounting member include fastener apertures aligned with standard wall box fastener apertures when the first hinged mounting member and the second hinged mounting member are in the extended mounting position.

8. The system of claim 1, wherein the wire interface is configured to accommodate a plurality of line conductors coupled to an electrical distribution system.

9. The system of claim 8, wherein the plurality of line conductors include a hot line conductor and a neutral line conductor.

10. The system of claim 8, wherein the wire interface is configured to accommodate a plurality of load conductors that may be coupled to one or more down-stream electrical devices.

11. The system of claim 1, wherein the at least one electrical circuit includes at least one set of outlet terminals accessible to a user via the cover member.

12. The system of claim 1, wherein the at least one electrical circuit includes at least one electrical switch coupled to a switch actuator mechanism accessible to a user via the cover member.

13. The system of claim 1, wherein the at least one electrical circuit is selected from a group of electrical circuits that includes a GFCI, an AFCI, and a TVSS.

14. The system of claim 1, wherein the at least one electrical circuit includes a night light.

15. A method comprising:
providing a wall box receptacle assembly including a wall box receptacle device secured to a retaining frame, the wall box receptacle device including a wiring interface disposed on a first side and electrically coupled to a plurality of receptacle openings disposed on a second side, a first hinged mounting member coupled to a first end of the retaining frame and a second hinged mounting member coupled to a second end of the retaining frame, the first hinged mounting member and the second hinged mounting member being rotatable between an extended mounting position and a retracted storage position;
coupling electrical wiring to the wiring interface;
rotating the first hinged member and the second hinged member into the retracted storage position for storage within a wall box or rotating the first hinged member and the second hinged member into the extended mounting position for subsequent connection to the wall box;
connecting the first hinged mounting member to a first mounting element on the wall box and connecting the second hinged mounting member to a second mounting element on the wall box;
providing a modular electrical wiring device including at least one electrical circuit disposed between a cover member and a rear body member, the at least one electrical circuit being coupled to a plurality of male terminal elements accessibly disposed in the rear body member; and
coupling the modular electrical wiring device to the wall box receptacle device, the plurality of male terminal elements being inserted into the plurality of receptacle openings to establish electrical continuity between the plurality of male terminal elements and the electrical wiring.

16. The method of claim 15, further comprising the step of connecting the wall box to a structural member.

17. The method of claim 15, wherein a qualified electrician performs the step of coupling the electrical wiring to the wiring interface.

18. The method of claim 17, wherein the electrical wiring includes a plurality of line conductors coupled to an electrical distribution system.

19. The method of claim 18, wherein the electrical wiring includes a plurality of load conductors that may be coupled to one or more down-stream electrical devices.

20. The method of claim 17, wherein a person that is not a qualified electrician performs the step of coupling the modular electrical wiring device to the wall box receptacle device.

21. The method of claim 17, wherein the step of rotating further comprises:
  rotating the first hinged member and the second hinged member into the retracted storage position;
  inserting the wall box receptacle assembly into the wall box;
  installing a wall surface material over the structural member to form a wall surface;
  cutting a portion of the wall surface to expose the wall box and the wall receptacle assembly disposed in the wall box;
  rotating the first hinged member and the second hinged member into the extended mounting position; and
  inserting the wall box receptacle device portion of the wall box receptacle assembly into the wall box until the first hinged member and the second hinged member abut the wall surface.

22. The method of claim 21, wherein a compression force is applied to the wall surface by the first hinged mounting member when the step of connecting the first hinged mounting member to the first mounting element is performed, and wherein a compression force is applied to the wall surface by the second hinged mounting member when the step of connecting the second hinged mounting member to the second mounting element is performed.

23. The method of claim 21, wherein the step of coupling the modular electrical wiring device to the wall box receptacle device is performed by a non-electrician.

24. The method of claim 23, further comprising:
  providing at least one second modular electrical wiring device including at least one second electrical circuit disposed between a second cover member and a second rear body member, the at least one second electrical circuit being coupled to a plurality of second male terminal elements accessibly disposed in the second rear body member;
  decoupling the modular electrical wiring device to the wall box receptacle device; and
  coupling the at least one second modular electrical wiring device to the wall box receptacle device, the plurality of second male terminal elements being inserted into the plurality of receptacle openings to establish electrical continuity between the plurality of second male terminal elements and the electrical wiring.

25. The method of claim 24, wherein either the at least one electrical circuit or the at least one second electrical circuit includes at least one set of outlet terminals accessible to a user via the cover member.

26. The method of claim 24, wherein either the at least one electrical circuit or the at least one second electrical circuit includes at least one electrical switch coupled to a switch actuator mechanism accessible to a user via the cover member.

27. The method of claim 24, wherein either the at least one electrical circuit or the at least one second electrical circuit is selected from a group of electrical circuits that includes a GFCI, an AFCI, and a TVSS.

28. The method of claim 24, wherein either the at least one electrical circuit or the at least one second electrical circuit includes a night light.

* * * * *